United States Patent
Fowle et al.

(10) Patent No.: US 12,017,498 B2
(45) Date of Patent: Jun. 25, 2024

(54) MASS DAMPER SYSTEM

(71) Applicant: Apple Inc., Cupertino, CA (US)

(72) Inventors: Samuel G. Fowle, San Francisco, CA (US); Jacob L Dawson, Sunnyvale, CA (US); Jeffrey K. Mock, Sunnyvale, CA (US); Islam Mohsen Shawki, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 76 days.

(21) Appl. No.: 17/733,543

(22) Filed: Apr. 29, 2022

(65) Prior Publication Data

US 2022/0388364 A1  Dec. 8, 2022

Related U.S. Application Data

(60) Provisional application No. 63/197,906, filed on Jun. 7, 2021.

(51) Int. Cl.
  *B60G 17/08* (2006.01)
  *B60G 15/06* (2006.01)
  *F16F 9/10* (2006.01)

(52) U.S. Cl.
  CPC .............. *B60G 17/08* (2013.01); *F16F 9/103* (2013.01)

(58) Field of Classification Search
  CPC .... B60G 3/18; B60G 17/08; B60G 2600/182; B60G 2202/413; B60G 2202/25; F16F 7/10; F16F 7/1017; F16F 7/112; F16F 9/103; F16F 2230/183
  See application file for complete search history.

(56) References Cited

U.S. PATENT DOCUMENTS

| | | | |
|---|---|---|---|
| 2,757,938 A | 8/1956 | Crowder |
| 2,901,239 A | 8/1959 | Sethna |
| 2,913,252 A | 11/1959 | Norrie |
| 2,955,841 A | 10/1960 | Faiver et al. |
| 3,089,710 A | 5/1963 | Fiala |

(Continued)

FOREIGN PATENT DOCUMENTS

| | | |
|---|---|---|
| CN | 108215946 A | 6/2018 |
| CN | 208439009 U | 1/2019 |

(Continued)

OTHER PUBLICATIONS

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

(Continued)

*Primary Examiner* — John Kwon
*Assistant Examiner* — Johnny H Hoang
(74) *Attorney, Agent, or Firm* — Young Basile Hanlon & MacFarlane, P.C.

(57) ABSTRACT

A mass damper system includes an unsprung mass, a sprung mass, a suspension component that supports the sprung mass with respect to the unsprung mass, and a damper mass that is connected to the unsprung mass. Motion control components are connected to the sprung mass and a fluid-operated system that transfers forces between the motion control components and the damper mass to regulate motion of the damper mass with respect to the unsprung mass.

21 Claims, 5 Drawing Sheets

(56) References Cited

U.S. PATENT DOCUMENTS

| | | |
|---|---|---|
| 3,231,058 A | 1/1966 | Batchelor et al. |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,656,409 A | 4/1987 | Shimizu |
| 4,659,106 A | 4/1987 | Fujita et al. |
| 4,784,378 A | 11/1988 | Ford |
| 4,834,416 A | 5/1989 | Shimoe et al. |
| 4,877,098 A | 10/1989 | Asanuma |
| 4,893,832 A | 1/1990 | Booher |
| 4,922,159 A | 5/1990 | Phillips et al. |
| 4,926,978 A | 5/1990 | Shibata et al. |
| 4,960,290 A | 10/1990 | Bose |
| 4,981,309 A | 1/1991 | Froeschle et al. |
| 4,991,698 A | 2/1991 | Hanson |
| 5,027,048 A | 6/1991 | Masrur et al. |
| 5,033,028 A | 7/1991 | Browning |
| 5,060,959 A | 10/1991 | Davis et al. |
| 5,103,942 A | 4/1992 | Schmitt |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,392,882 A | 2/1995 | Mackovjak et al. |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,612,110 A | 3/1997 | Watremez |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,152,267 A | 11/2000 | Iwai et al. |
| 6,170,838 B1 | 1/2001 | Laurent et al. |
| 6,233,510 B1 | 5/2001 | Platner et al. |
| 6,249,728 B1 | 6/2001 | Streiter |
| 6,260,869 B1 | 7/2001 | Hanlon et al. |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Pix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,597,169 B2 | 10/2009 | Borroni-Bird et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,734,384 B2 | 6/2010 | Konopa et al. |
| 7,818,109 B2 | 10/2010 | Scully |
| 7,823,891 B2 | 11/2010 | Bushko et al. |
| 7,899,607 B2 | 3/2011 | Shin et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Noue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,474,801 B2 | 7/2013 | Ishiguro et al. |
| 8,490,761 B2 | 7/2013 | Kondo |
| 8,499,903 B2 | 8/2013 | Sakuta et al. |
| 8,525,453 B2 | 9/2013 | Ogawa |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,033,121 B2 | 5/2015 | Kazmirski et al. |
| 9,038,271 B2 | 5/2015 | Huang et al. |
| 9,062,737 B2 | 6/2015 | Hoult |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano et al. |
| 9,399,384 B2 | 7/2016 | Lee et al. |
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |

(56) References Cited

U.S. PATENT DOCUMENTS

| | | |
|---|---|---|
| 9,676,244 B2 | 6/2017 | Giovanardi et al. |
| 9,702,349 B2 | 7/2017 | Anderson et al. |
| 9,821,835 B2 | 11/2017 | Nieto et al. |
| 9,855,887 B1 | 1/2018 | Potter et al. |
| 9,868,332 B2 | 1/2018 | Anderson et al. |
| 9,884,545 B1 | 2/2018 | Addanki et al. |
| 9,909,644 B2 | 3/2018 | Cegar et al. |
| 9,975,391 B2 | 5/2018 | Tseng et al. |
| 10,054,203 B2 | 8/2018 | Fida |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,378,599 B2 | 8/2019 | Mettrick et al. |
| 10,407,035 B1 | 9/2019 | Gadda et al. |
| 10,513,161 B2 | 12/2019 | Anderson et al. |
| 10,960,723 B1 | 3/2021 | Hall et al. |
| 11,078,981 B2 | 8/2021 | Zhang et al. |
| 11,285,773 B1 | 3/2022 | Hall et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0230170 A1 | 10/2005 | Robinson |
| 2005/0241899 A1 | 11/2005 | Rutz et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0071743 A1 | 3/2009 | Gashi |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0116572 A1 | 5/2010 | Schmitt et al. |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0209938 A1 | 9/2011 | Basadzishvili |
| 2011/0226570 A1 | 9/2011 | Ludwig |
| 2011/0250477 A1 | 10/2011 | Yoshida et al. |
| 2011/0277241 A1 | 11/2011 | Schejbal |
| 2012/0013277 A1 | 1/2012 | Ogawa |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0032442 A1 | 2/2013 | Tuluie |
| 2013/0037362 A1 | 2/2013 | Gartner et al. |
| 2013/0060422 A1 | 3/2013 | Ogawa et al. |
| 2013/0060423 A1 | 3/2013 | Jolly |
| 2013/0087420 A1 | 4/2013 | Fraley et al. |
| 2013/0106074 A1 | 5/2013 | Koku et al. |
| 2013/0112514 A1 | 5/2013 | Hanna et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0277155 A1 | 10/2013 | Huang et al. |
| 2013/0341143 A1 | 12/2013 | Brown |
| 2014/0001687 A1 | 1/2014 | Braman et al. |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0047933 A1 | 2/2015 | Keil et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0343876 A1 | 12/2015 | Yoshizawa et al. |
| 2015/0354647 A1 | 12/2015 | Tironi et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Irovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |

(56) References Cited

U.S. PATENT DOCUMENTS

| | | |
|---|---|---|
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1* | 12/2018 | Boon .................. B60G 17/018 |
| 2018/0370314 A1 | 12/2018 | Higle |
| 2019/0011004 A1 | 1/2019 | Mettrick et al. |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |
| 2021/0070129 A1* | 3/2021 | Keil .................. B60G 17/019 |
| 2021/0199169 A1 | 7/2021 | Morton et al. |
| 2021/0252935 A1* | 8/2021 | Belter .................. F16F 9/065 |
| 2022/0388364 A1 | 12/2022 | Fowle et al. |

FOREIGN PATENT DOCUMENTS

| | | |
|---|---|---|
| CN | 111139730 B | 6/2021 |
| CN | 109955704 B | 8/2021 |
| CN | 115560031 A | 1/2023 |
| CN | 115637638 A | 1/2023 |
| DE | 4037223 A1 | 10/1991 |
| DE | 19853876 A1 | 5/2000 |
| DE | 19850169 C1 | 7/2000 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102016112240 A1 | 1/2018 |
| DE | 102018208774 A1 | 12/2019 |
| EP | 0344923 A1 | 12/1989 |
| EP | 1693233 B1 | 4/2009 |
| EP | 2072855 A1 | 6/2009 |
| EP | 2233330 B1 | 2/2013 |
| EP | 3088230 A1 | 11/2016 |
| EP | 2976544 B1 | 11/2018 |
| GB | 2220625 A | 1/1990 |
| GB | 2437633 A | 10/2007 |
| GB | 2539866 A | 1/2017 |
| JP | H06183365 A | 7/1994 |
| JP | 2004155258 A | 6/2004 |
| JP | 2005289321 A | 10/2005 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 20060064917 A | 6/2006 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

Porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www. porsche.com/usa/aboutporsche/pressreleases/pag/?pool=international-de&id-2011-01-10, 6 pp.

Autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

Press.porsche.com, "Introducing the Porsche 918 Spyder", Date Unknown, http://press.porsche.com/news/release.php?id-787, Downloaded Mar. 13, 2017, 7 pp.

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Edren, Johannes, "Motion Modelling and Control Strategies of Over-Actuated Vehicles", Doctoral Thesis, Stockholm 2014 (56 pp).

Daimler.com, "Suspension: the world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

Youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

International Search Report and Written Opinion in Intl App No. PCT/US2022/027040 mailed Jul. 5, 2022 (15 pp).

Collins, S., "J Dampers in Formula One—Racecar Engineering", Downloaded Apr. 18, 2023, https://www.racecar-engineering.com/articles/f1/understanding-the-j-damper/ (4 pp).

* cited by examiner

MASS DAMPER SYSTEM

CROSS-REFERENCE TO RELATED APPLICATIONS

This application claims the benefit of U.S. Provisional Application No. 63/197,906, filed on Jun. 7, 2021, the content of which is hereby incorporated by reference in its entirety for all purposes.

TECHNICAL FIELD

This disclosure relates to vehicle suspensions.

BACKGROUND

Suspension systems are used to reduce the transmission of vibrations between two components. In a vehicle, a sprung mass of the vehicle typically includes the body and passenger compartment of the vehicle and the passenger compartment of the vehicle, and an unsprung mass of the vehicle typically includes tires, wheels, and components directly connected to the wheel. The vehicle suspension supports the sprung mass with respect to the unsprung mass and reduces transmission of vibrations from the unsprung mass of the vehicle to the sprung mass of the vehicle. Some suspension systems include a mass damper system to reduce unwanted vibration effects.

SUMMARY

A first aspect of the disclosure is a mass damper system that includes an unsprung mass, a sprung mass, a suspension component that supports the sprung mass with respect to the unsprung mass, and a damper mass that is connected to the unsprung mass. The mass damper system also includes motion control components that are connected to the sprung mass and a fluid-operated system that transfers forces between the motion control components and the damper mass to regulate motion of the damper mass with respect to the unsprung mass.

In some implementations of the mass damper system according to the first aspect of the disclosure, the motion control components include a spring and a damper. In some implementations of the mass damper system according to the first aspect of the disclosure, the motion control components include a spring and an actively controlled actuator.

In some implementations of the mass damper system according to the first aspect of the disclosure, the fluid-operated system transfers forces from the motion control components to the damper mass using a leader-follower arrangement. The leader-follower arrangement of the fluid-operated system may include a first fluid-operated cylinder that is connected to the damper mass, a second fluid-operated cylinder that is connected to the motion control components, and a fluid carrying connection between the first fluid-operated cylinder and the second fluid-operated cylinder.

In some implementations of the mass damper system according to the first aspect of the disclosure, the suspension component is an active suspension component. In some implementations of the mass damper system according to the first aspect of the disclosure, the active suspension component is at least one of an electrically operated active suspension actuator or a fluid-operated active suspension actuator. In some implementations of the mass damper system according to the first aspect of the disclosure, the unsprung mass includes a vehicle wheel assembly and the sprung mass includes a vehicle body structure.

A second aspect of the disclosure is a vehicle that includes an unsprung mass, a sprung mass, and a suspension component that supports the sprung mass with respect to the unsprung mass. The vehicle also includes a first fluid-operated cylinder, a damper mass that is connected to the unsprung mass by the first fluid-operated cylinder, a second fluid-operated cylinder, a spring that is connected to the second fluid-operated cylinder, and a damper that is connected to the second fluid-operated cylinder. The damper mass applies an inertial force to the first fluid-operated cylinder. The spring and the damper cooperate to apply a resultant force to the second fluid-operated cylinder. A fluid carrying connection between the first fluid-operated cylinder and the second fluid-operated cylinder transfers the inertial force and the resultant force between the first fluid-operated cylinder and the second fluid-operated cylinder to regulate motion of the damper mass with respect to the unsprung mass.

In some implementations of the vehicle according to the second aspect of the disclosure, the unsprung mass includes a wheel assembly, the first fluid-operated cylinder is connected to the wheel assembly, and the damper mass is movable with respect to the wheel assembly. In some implementations of the vehicle according to the second aspect of the disclosure, the sprung mass includes a vehicle body structure, the second fluid-operated cylinder is connected to the vehicle body structure, the spring is connected to the vehicle body structure, and the damper is connected to the vehicle body structure.

In some implementations of the vehicle according to the second aspect of the disclosure, the fluid carrying connection connects the first fluid-operated cylinder and the second fluid-operated cylinder in a leader-follower arrangement. In some implementations of the vehicle according to the second aspect of the disclosure, the fluid carrying connection includes a fluid line that is connected to the first fluid-operated cylinder and the second fluid-operated cylinder. In some implementations of the vehicle according to the second aspect of the disclosure, the suspension component is at least one of an electrically operated active suspension actuator or a fluid-operated active suspension actuator.

A third aspect of the disclosure is a vehicle that includes an unsprung mass, a sprung mass, and a suspension component that supports the sprung mass with respect to the unsprung mass. The vehicle also includes a first fluid-operated cylinder, a damper mass that is connected to the unsprung mass by the first fluid-operated cylinder, a second fluid-operated cylinder, a spring that is connected to the second fluid-operated cylinder, and an actuator that is connected to the second fluid-operated cylinder. The damper mass applies an inertial force to the first fluid-operated cylinder. The spring and the actuator cooperate to apply a resultant force to the second fluid-operated cylinder. A fluid carrying connection between the first fluid-operated cylinder and the second fluid-operated cylinder transfers the inertial force and the resultant force between the first fluid-operated cylinder and the second fluid-operated cylinder to regulate motion of the damper mass with respect to the unsprung mass.

In some implementations of the vehicle according to the third aspect of the disclosure, the vehicle includes one or more motion sensors and a controller. The controller causes the actuator to apply a reaction force to the second fluid-operated cylinder based on motion signals that are output by the one or more motion sensors.

In some implementations of the vehicle according to the third aspect of the disclosure, the unsprung mass includes a wheel assembly, the first fluid-operated cylinder is connected to the wheel assembly, and the damper mass is movable with respect to the wheel assembly. In some implementations of the vehicle according to the third aspect of the disclosure, the sprung mass includes a vehicle body structure, the second fluid-operated cylinder is connected to the vehicle body structure, the spring is connected to the vehicle body structure, and the actuator is connected to the vehicle body structure.

In some implementations of the vehicle according to the third aspect of the disclosure, the fluid carrying connection connects the first fluid-operated cylinder and the second fluid-operated cylinder in a leader-follower arrangement. In some implementations of the vehicle according to the third aspect of the disclosure, the fluid carrying connection includes a fluid line that is connected to the first fluid-operated cylinder and the second fluid-operated cylinder. In some implementations of the vehicle according to the third aspect of the disclosure, the suspension component is at least one of an electrically operated active suspension actuator or a fluid-operated active suspension actuator.

DETAILED DESCRIPTION

A mass damper system (e.g., a tuned mass damper or a reaction mass actuator) can be used to reduce unwanted vibration effects that are applied to a primary mass. A secondary mass, which is referred to herein as a damper mass, is smaller than the first mass and is connected to the primary mass by a passive damper assembly having characteristics that are selected (e.g., tuned) so that movement of the damper mass will result in vibrations that are contrary to the vibrations experienced by the primary mass, which will result in a reduction of the unwanted vibration effects, or by a controlled damper assembly that is operated to reduce the unwanted vibration effects. For example, the damper assembly may be configured so that movement of the damper mass is out of phase with and/or opposite in direction relative to the unwanted vibration effects that are experienced by the primary mass. Mass damper systems include motion control components that control motion of the damper with respect to the primary mass. In a typical passive damper example, the motion control components include a spring and a damper, where the spring and damper are selected according to the desired motion characteristics of the damper mass. In an actively controlled example, the motion control components include a spring and an actively controlled actuator. As used herein, the term "spring" encompasses mechanisms of various types, such as mechanical springs, that exert a force that is dependent upon a distance by which they are compressed or extended relative to an equilibrium position.

The suspension systems that are described herein include a damper mass that is connected to part of the unsprung mass of the vehicle, such as the wheel of the vehicle. To avoid the complexity of packaging the motion control components of the mass damper system in the wheel of the vehicle, some of the motion control components are connected to the sprung mass of the vehicle, and forces from the motion control components are transmitted to the damper mass using a fluid-operated force transfer system (e.g., a hydraulic system or a pneumatic system), which may include fluid-operated cylinders in a leader-follower arrangement.

Figure 1:
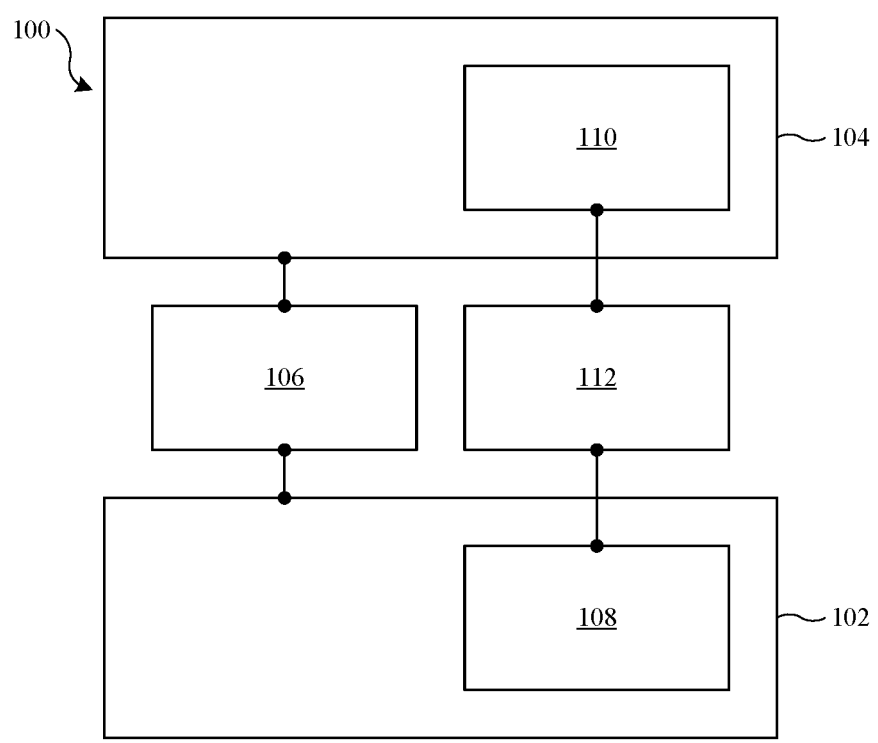
FIG. 1 is a block diagram that shows a mass damper system.

FIG. 1 is a block diagram that shows a mass damper system 100. The mass damper system 100 includes an unsprung mass 102, a sprung mass 104, a suspension component 106, a damper mass 108, motion control components 110, and a hydraulic system 112. As an example, the unsprung mass 102 may include a vehicle wheel and the sprung mass 104 may include a vehicle body structure.

The suspension component 106 supports the sprung mass 104 with respect to the unsprung mass 102 and is configured to reduce the transmission of vibrations from the unsprung mass 102 to the sprung mass 104. As one example, the suspension component 106 may be a passive suspension component, such as a spring, a damper, or an air spring. As another example, the suspension component 106 may be an active suspension component such as an electrically operated active suspension actuator or a fluid-operated active suspension actuator.

The damper mass 108 is connected to the unsprung mass 102. Motion of the damper mass 108 with respect to the unsprung mass 102 is controlled by the motion control components 110. Damped motion of the damper mass 108 applies a reaction force to the unsprung mass 102 to reduce unwanted vibrations that are experienced by the unsprung mass 102. Reduction of these unwanted vibrations may reduce unwanted vibration-related effects, such as wheel hop in implementations where the unsprung mass 102 includes a vehicle wheel.

The motion control components 110 are connected to the sprung mass 104. The motion control components 110 are connected to the sprung mass 104 in a manner that results in the motion control components 110 moving generally in unison with the sprung mass 104 as part of the sprung mass 104, such as a direct connection of the motion control components to a portion of the sprung mass 104, such as a vehicle body structure in some implementations.

The motion control components 110 include passive and/or active components that are configured to generate forces that can be transferred to the damper mass 108 in order to damp the motion of the damper mass 108. As one example, the motion control components 110 may include a spring and a damper. The spring may be any type of spring, such as a coil spring that operates solely in compression, a coil spring that operates in compression and tension, a coil spring that operates solely in tension, a torsion spring, a leaf spring, a pneumatic spring, or other type of spring. As another example, the motion control components 110 may include a spring and an actively controlled actuator. As another example, the motion control components 110 may include compliance that is inherent in the hydraulic system and functions as a spring, as well as at least one of a damper or an actively controlled actuator. As examples, the actively controlled actuator may be an electrically controlled actuator, such as an electrically controlled linear actuator, or the actuator may be a hydraulically controlled actuator, such as a hydraulically controlled linear actuator.

The hydraulic system 112 allows the motion control components 110 to regulate motion of the damper mass 108 with respect to the unsprung mass 102 by transferring forces between the damper mass 108 and the motion control components 110. As an example, the hydraulic system 112 may transfers the forces from the motion control components 110 to the damper mass 108 using a leader-follower arrangement.

As an example of a leader-follower arrangement, the damper mass 108 may be connected to the unsprung mass 102 by a first hydraulic cylinder so that movement of the damper mass 108 with respect to the unsprung mass 102 applies an inertial force to the first hydraulic cylinder to cause displacement of a fluid (e.g., hydraulic fluid such as an oil). The displacement of the fluid is transmitted to a second hydraulic cylinder by a fluid carrying connection, such as one or more fluid lines that extend from the first hydraulic cylinder to the second hydraulic cylinder. The second hydraulic cylinder is connected to the motion control components 110. As the second hydraulic cylinder moves in response to fluid pressure transmitted when the damper mass 108 moves, resultant forces are applied to the second hydraulic cylinder by the motion control components. The resultant force is then transmitted to the first hydraulic cylinder by way of the fluid carrying connection of the hydraulic system, thereby damping motion of the damper mass 108. Thus, vibration of the unsprung mass 102 causes a corresponding vibration of the damper mass 108. The inertial force and the resultant force are transferred between the damper mass 108 and the motion control components 110 by the hydraulic system 112, and the resulting combined reaction force is applied to the unsprung mass. The result of the leader-follower arrangement of the hydraulic system 112 is equivalent to connecting the motion control components 110 directly to the damper mass 108, but while allowing the motion control components 110 to be located in the sprung mass 104 instead of in the unsprung mass 102.

Further description of components that can be used to implement similarly named components of the mass damper system 100 is described herein with reference to FIGS. 2-7 and such components can be included in the mass damper system 100.

Figure 2:
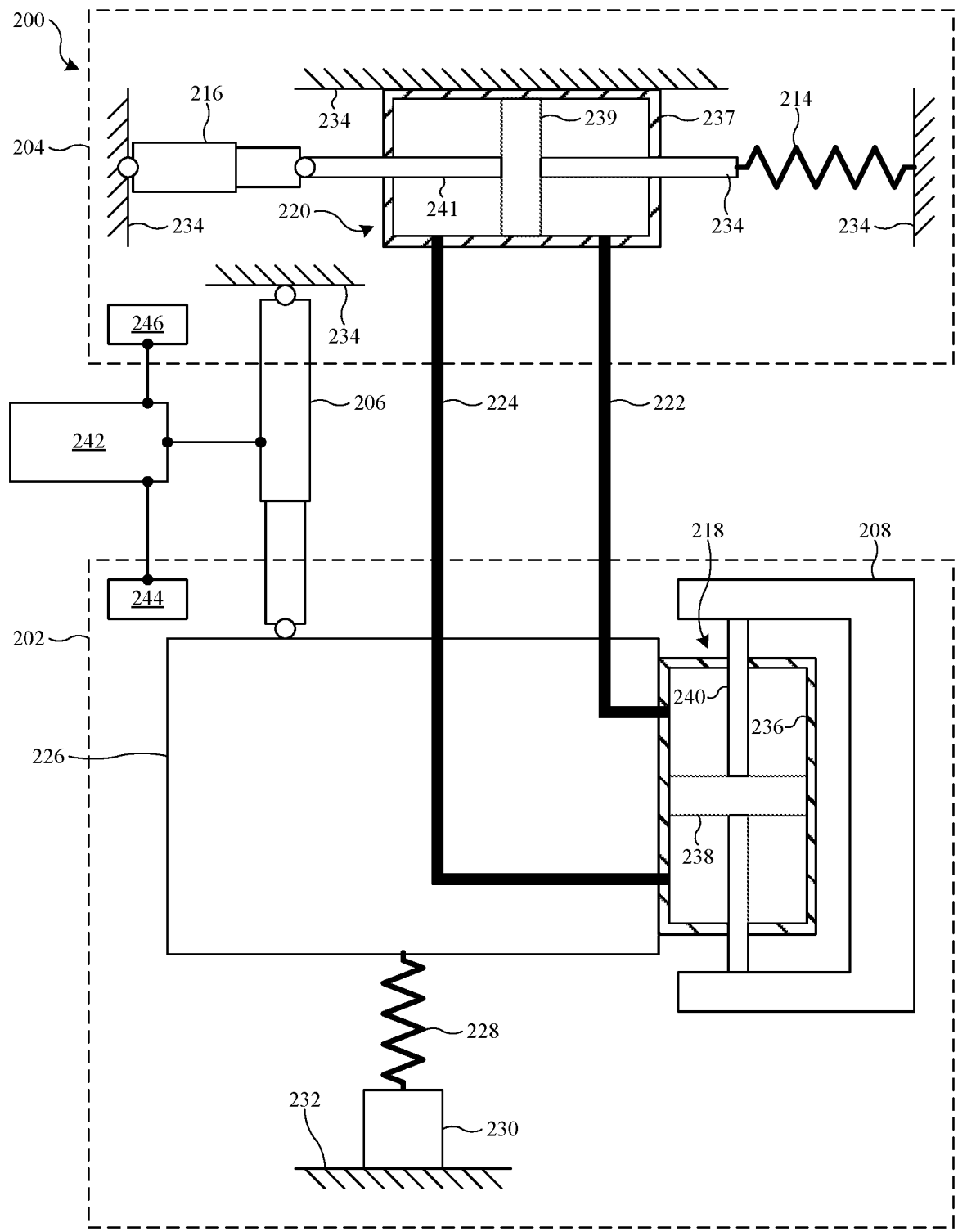
FIG. 2 is a schematic illustration of a mass damper system for a vehicle according to a first example implementation.

FIG. 2 is a block diagram that shows a mass damper system 200 that is implemented in the context of a vehicle. The description of the mass damper system 100 is applicable to the mass damper system 200 except as stated to the contrary herein.

The mass damper system 200 includes an unsprung mass 202, a sprung mass 204, a suspension component 206, and a damper mass 208, The mass damper system 200 also includes a spring 214 and a damper 216 which function as motion control components. The mass damper system 200 also includes a first hydraulic cylinder 218, a second hydraulic cylinder 220, a first fluid transmission line 222, and a second fluid transmission line 224. The unsprung mass 202 includes a wheel assembly 226, and a tire 228 having a contact patch 230 that is configured to contact a surface 232, such as a road surface. The sprung mass 204 includes a vehicle body structure 234. The tire 228 is represented in FIG. 2 as a spring according to the tendency of the tire 228 to behave equivalently to a spring between the wheel assembly 226 and the surface 232.

The suspension component 206 supports the sprung mass 204 with respect to the unsprung mass 202 and is configured to reduce the transmission of vibrations from the unsprung mass 202 to the sprung mass 204. As an example, the suspension component 206 may be connected to the wheel assembly 226 and the vehicle body structure 234 to support the vehicle body structure 234 with respect to the wheel assembly 226 and to reduce the transmission of vibrations from the wheel assembly 226 to the vehicle body structure 234. As examples, the suspension component 206 may be a passive suspension component or an active suspension component.

The damper mass 208 is part of the unsprung mass 202 and is connected to and supported by the wheel assembly 226. As an example, the damper mass 208 may be connected to and/or located inside of a knuckle (e.g., steering knuckle/suspension knuckle) of the wheel assembly 226. The damper mass 208 is connected to the wheel assembly 226 by the first hydraulic cylinder 218, which allows the damper mass 208 to move with respect to the wheel assembly 226. Movement (e.g., vibration) of the wheel assembly 226 causes a corresponding movement of the damper mass 208, which applies an inertial force to the first hydraulic cylinder 218.

The damper mass 208 may be directly connected to the first hydraulic cylinder 218, and the first hydraulic cylinder 218 may be directly connected to the wheel assembly 226. As an example, the first hydraulic cylinder 218 may include a housing 236 that defines a fluid filled interior space, a piston 238 that is located in the interior space, and a rod 240 that is connected to the piston 238 and extends out of the interior space. A double ended configuration is shown for the rod 240, but a single ended configuration can be used. In the illustrated example, the housing 236 is shown as being connected (e.g., by a fixed connection) to the wheel assembly 226, and the damper mass 208 is shown as being connected to the rod 240, but these connections may be reversed. The damper mass 208 may be supported relative to the wheel assembly 226 solely by the first hydraulic cylinder 218, and may be otherwise free from connection to other structures, such as the sprung mass 204.

As will be explained further herein, motion of the damper mass 208 with respect to the wheel assembly 226 is controlled by the motion control components that damp motion of the damper mass 208 by applying a resultant force in opposition to the inertial force, which in this implementation include the spring 214 and the damper 216. The resulting combined force (e.g., the inertial force combined with the resultant force) acts on the unsprung mass to reduce unwanted vibrations that are experienced by the unsprung mass 202. Reduction of these unwanted vibrations may reduce unwanted vibration-related effects, such as wheel hop, which could result in the contact patch 230 of the tire 228 disengaging from the surface 232.

The spring 214 and the damper 216 are connected to the vehicle body structure 234 and are also connected to the second hydraulic cylinder 220. As an example, the second hydraulic cylinder 220 may include a housing 237 that defines a fluid filled interior space, a piston 239 that is located in the interior space, and a rod 241 that is connected to the piston 239 and extends out of the interior space. A double ended configuration is shown for the rod 241, but a single ended configuration can be used. The housing 237 is connected to the wheel assembly 226, the spring 214 is connected to the rod 241, and the damper 216 is connected to the rod 241. Using a double ended configuration for the rod 241, the spring 214 and the damper 216 are at opposite ends of the rod 241, but the spring 214 and the damper 216 may be connected to the same end of the rod 241, for example, when using a single-ended configuration for the rod 241. It should be understood, however, that the configuration shown in schematic in nature and intended to explain the functions performed by the components. Various different structural configurations of the components may be used. As one example, the spring 214 is implemented using two springs that are located at opposite ends of the assembly, so that the two springs are both compressed and are never loaded in tension. In another example, the rod 241 is hollow and the damper 216 is integrated into the middle of the rod 241. In another example, the damping function of the damper 216 could incorporated into one or both of the first fluid transmission line 222 or the second fluid transmission line 224, or between one or both of the first fluid transmission line 222 or the second fluid transmission line 224 and the second hydraulic cylinder 220, so that the damping acts directly on the fluid in the leader-follower hydraulic system.

The spring 214 applies a spring force to the second hydraulic cylinder 220 that corresponds to movement, by the spring 214, toward a neutral position of the spring 214. This may be referred to as a return force that resists displacement of the damper mass 208 away from a neutral position of the damper mass 208 and acts to return the damper mass 208 to its neutral position after displacement. Because the spring force is transmitted to the damper mass 208, the transmitted spring force is applied to the damper mass 208 in a direction that urges motion of the damper mass 208 in a direction that corresponds to return of the spring 214 to its neutral position. The spring 214 may be any type of spring, such as a coil spring that operates solely in compression, a coil spring that operates in compression and tension, a coil spring that operates solely in tension, a torsion spring, a leaf spring, a pneumatic spring, or other type of spring.

The damper 216 is configured to resist motion of the damper mass 208, which allows for control of the motion characteristics (e.g., oscillation frequency) of the damper mass 208. The damper 216 is a passive component, such as a fluid filled damper (e.g., oil-filled).

The resultant force is a combination of the forces applied to the second hydraulic cylinder 220 by the spring 214 and the damper 216, which acts on the damper mass through the first hydraulic cylinder to regulate motion of the damper mass 208 with respect to the unsprung mass 202. Transmission of forces between the first hydraulic cylinder 218 and the second hydraulic cylinder 220 is performed using a fluid carrying connection between the first hydraulic cylinder 218 and the second hydraulic cylinder 220. The fluid carrying connection transfers the inertial force and the resultant force between the first hydraulic cylinder 218 and the second hydraulic cylinder 220 to regulate motion of the damper mass 208 with respect to the unsprung mass 202. The fluid carrying connection includes one or more fluid lines that are connected to the first hydraulic cylinder 218 and the second hydraulic cylinder 220, such as the first fluid transmission line 222 and the second fluid transmission line 224 in the illustrated implementation. The first fluid transmission line 222 and the second fluid transmission line 224 may connect the first hydraulic cylinder 218 to the second hydraulic cylinder 220 in a leader-follower arrangement, as described with respect to the hydraulic system 112.

The mass damper system 200 includes a controller 242, a first motion sensor 244 that is connected to the unsprung mass 102, and a second motion sensor 246 that is connected to the sprung mass 104. The first motion sensor 244 is configured to measure motion of the unsprung mass 102 and output a first motion signal that represents motion of the unsprung mass 102. The second motion sensor 246 is configured to measure motion of the sprung mass 104 and output a second motion signal that represents motion of the sprung mass 104. The first motion sensor 244 and the second motion sensor 246 may each be configured to measure velocity and/or acceleration in one or more linear degrees of freedom and/or one or more rotational degrees of freedom. As an example, the first motion sensor 244 and the second motion sensor 246 may be inertial measurement units. The controller 242 is configured to receive the first motion signal, the second motion signal, and/or additional sensor output signals and determine one or more commands for controlling one or more active components of the mass damper system 200. As an example, the controller 242 may output a command that controls operation of the suspension component 206 (e.g., implemented as an active suspension component) according to motion of the unsprung mass 202 and/or the sprung mass 204, such as a measure of relative motion of the unsprung mass 202 and the sprung mass 204.

Figure 3:
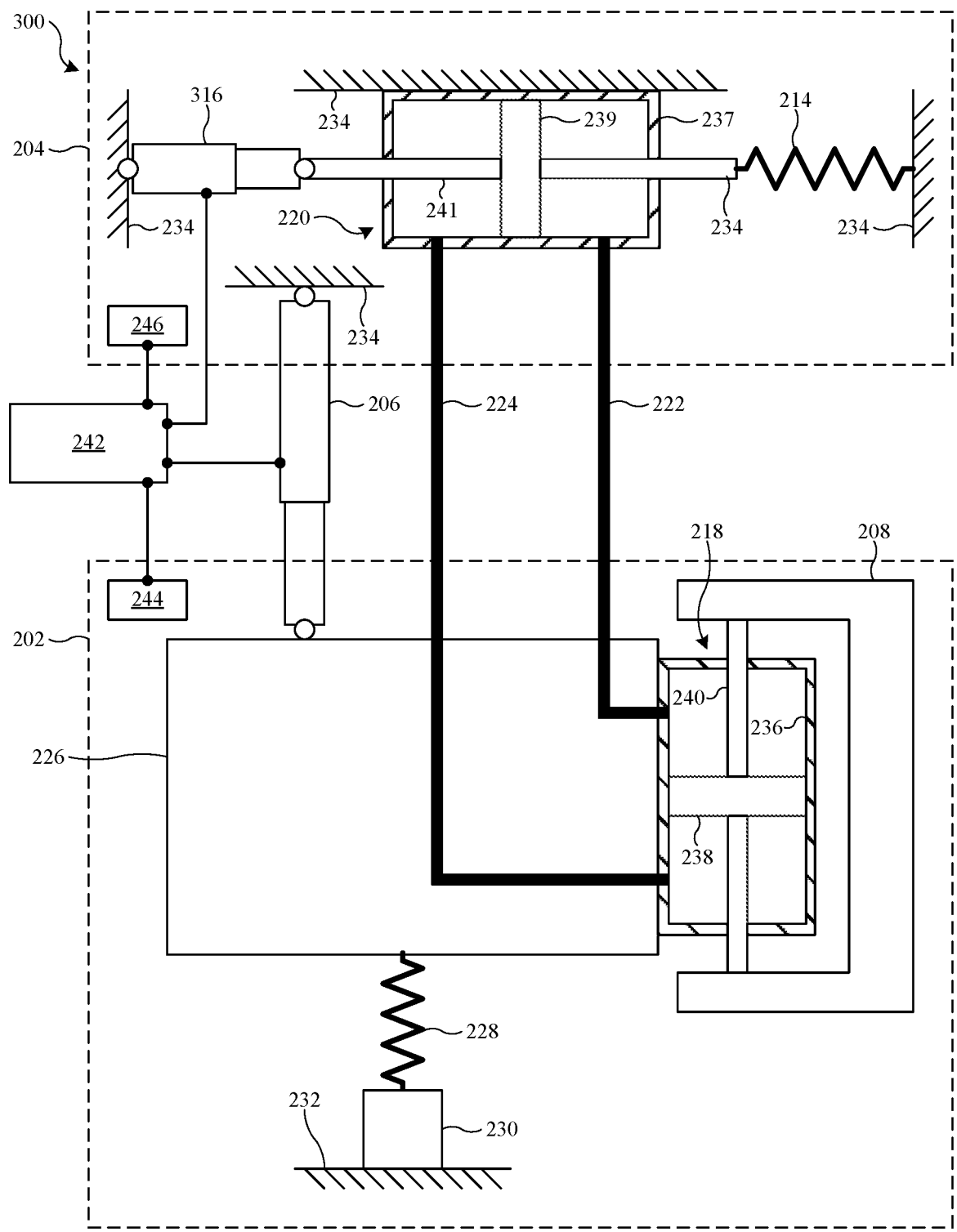
FIG. 3 is a schematic illustration of a mass damper system for a vehicle according to a second example implementation.

FIG. 3 is a block diagram that shows a mass damper system 300 that is implemented in the context of a vehicle. The descriptions of the mass damper system 100 and the mass damper system 200 are applicable to the mass damper system 300 except as stated to the contrary herein. In particular, some like-numbered components from the mass damper system 200 are included in the mass damper system 300 and are as previously described except as noted herein.

In the mass damper system 300, the damper 216 of the mass damper system 200 is replaced by an actuator 316. The actuator 316 is an actively controlled actuator component such as an electric or hydraulic linear actuator, and is connected to the second hydraulic cylinder 220 so that the spring 214 and the actuator 316 cooperate to apply a resultant force to the second hydraulic cylinder 220. The resultant force applied by the actuator 316 and the spring 214 is transferred to the first hydraulic cylinder 218 and thereby applied to the damper mass 208 in the manner previously described.

The controller 242 functions as previously described and further controls the actuator 316 to apply a reaction force to the second hydraulic cylinder based on motion signals that are output by one or more motion sensors, such as the first motion sensor 244 and the second motion sensor 246. A command is determined by the controller 242 based on motion of the unsprung mass 202 and/or the sprung mass 204 and the command is transmitted to the actuator 316 to cause application of the reaction force by the actuator 316.

Figure 4:
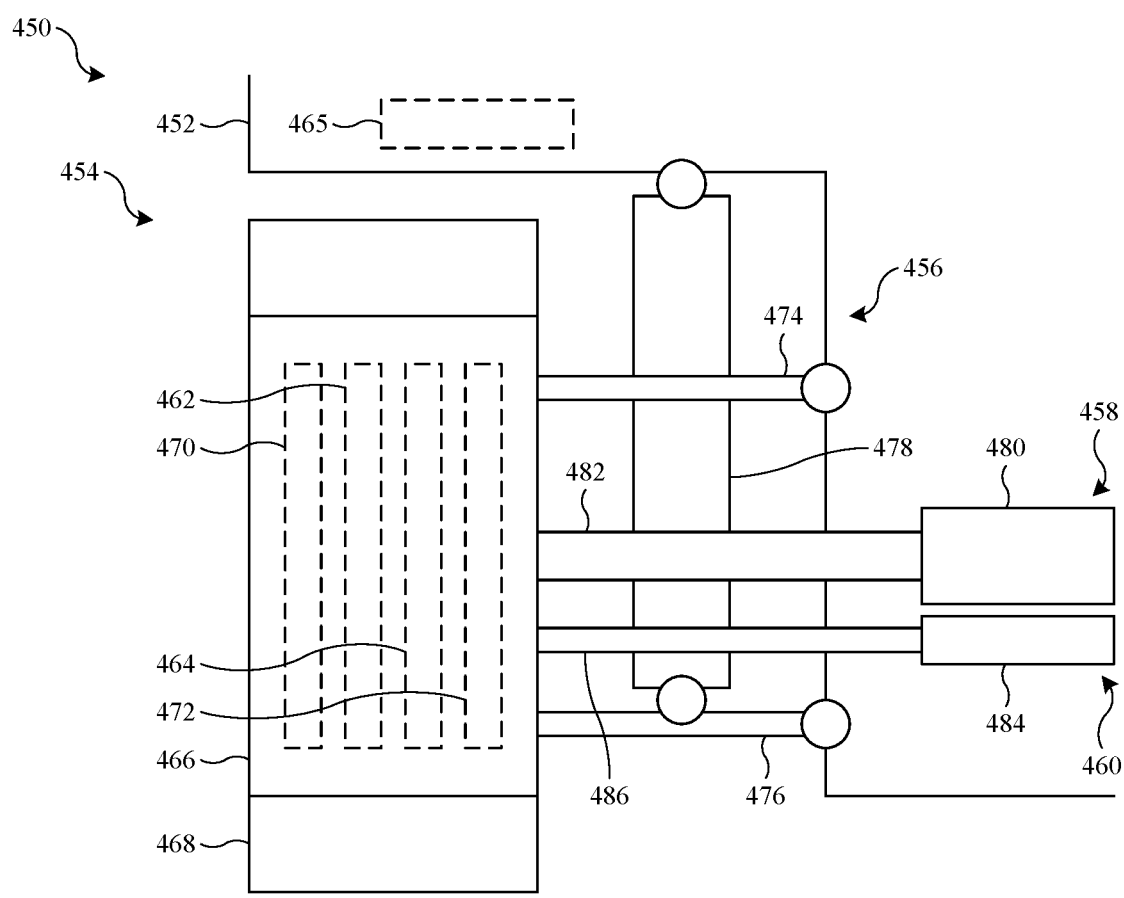
FIG. 4 is a schematic illustration that shows a portion of a vehicle.

FIG. 4 is a schematic illustration that shows a part of a vehicle 450. The mass damper systems that are described herein may be implemented in the context of the vehicle 450. As an example, the vehicle 450 may be a conventional road-going vehicle that is supported by wheels and tires (e.g., four wheels and tires). As an example, the vehicle 450 may be a passenger vehicle that includes a passenger compartment that is configured to carry one or more passengers. As another example, the vehicle 450 may be a cargo vehicle that is configured to carry cargo items in a cargo compartment.

In the illustrated example, the vehicle 450 includes a vehicle body structure 452, a wheel assembly 454, a suspension system 456, a propulsion system 458, a steering system 460, a brake system 462, wheel-side mass damper components 464, and body-side mass damper components 465.

The vehicle body structure 452 may be a single or a multi-part structure including, for example, a frame, a subframe, a unibody, a body, a monocoque, and/or other types of vehicle frame and body structures. The vehicle body structure 452 may include or support components that define internal structural portions of the vehicle (e.g., frame rails, structural pillars, etc.), and external aesthetic portions of the vehicle (e.g., body panels). The vehicle body structure 452 may define a passenger compartment and/or a cargo compartment.

The wheel assembly 454 includes a wheel 466, a tire 468, and a wheel hub 470. The wheel 466, the tire 468, and the wheel hub 470 are all conventional components. For example, the wheel 466 may be a steel wheel of conventional design that supports the tire 468, which may be a pneumatic tire. The wheel hub 470 serves as an interface between non-rotating components of the suspension system 456 of the vehicle 450, and rotating components, including the wheel 466 and the tire 468. As an example, the wheel hub 470 may include a bearing that allows rotation relative to components of the suspension system 456.

The suspension system 456 may include a knuckle 472, an upper control arm 474, a lower control arm 476, and a suspension component 478. The knuckle 472 is located partly inside an internal space of the wheel 466 and serves as a support structure for components of the wheel assembly 454 and the brake system 462. The knuckle 472 is connected to the wheel hub 470 to support the wheel 466 and the tire 468 for rotation with respect to the knuckle. The knuckle 472 is also connected to non-rotating components of the brake system 462, while rotating components of the brake system 462 are connected to the wheel hub 470 and/or the wheel 466.

The upper control arm 474 and the lower control arm 476 connect the knuckle 472 to the vehicle body structure 452 such that the knuckle 472 is movable with respect to the vehicle body structure 452, primarily in a generally vertical direction. As an example, the upper control arm 474 and the lower control arm 476 may each be connected to the vehicle body structure 452 and to the knuckle 472 by pivot joints that allow rotation in one or more rotational degrees of freedom. The suspension component 478 is configured to regulate motion of the wheel assembly 454 with respect to the vehicle body structure 452. The suspension component 478 may be, as examples, a shock, a strut, a spring, a linear actuator, or other active suspension component or passive suspension component.

The propulsion system 458 includes propulsion components that are configured to cause motion of the vehicle 450 (e.g., accelerating the vehicle 450), by generating and transmitting torque to the wheel assembly 454 (and other wheels of the vehicle 450). In the illustrated example, the propulsion system 458 includes a motor 480 and a drive shaft 482 that connects the motor 480 to the wheel assembly 454. The motor 480 may be, as examples, an internal combustion engine powered by a combustible fuel or one or more electric motors that are powered by electricity (e.g., from a battery). Electric motors that are included in the propulsion system 458 may further be configured to operate as generators that charge the battery in a regenerative braking configuration.

The steering system 460 is operable to cause the vehicle to turn by changing a steering angle of the wheel assembly 454 (and other wheels of the vehicle 450). In the illustrated implementation, the steering system 460 includes a steering actuator 484 and a steering linkage 486 that is connected to the knuckle 472. The brake system 462 provides deceleration torque for decelerating the vehicle 450 using, for example, friction braking components.

The mass damper systems described herein are represented in FIG. 4 by the wheel-side mass damper components 464, and the body-side mass damper components 465, which are connected by fluid carrying connections such as fluid lines (not shown in FIG. 4). These components operate as previously described with respect to the mass damper system 100, the mass damper system 200, the mass damper system 300, and/or the mass damper system 400.

The implementations described herein utilize a hydraulic system to transfer forces between the wheel-side mass damper components 464 and the body-side mass damper components 465. It should be understood that all such systems including the mass damper system 100, the mass damper system 200, the mass damper system 300, and the mass damper system 400, may be instead implemented using pneumatic components, such as pneumatic cylinders and pneumatic lines, with the designs of such systems taking the compressibility of the working gas into account, for example, by treating the compressibility of the working gas as part of the spring force of the motion control components. Components of hydraulic and pneumatic systems may be referred to collectively as fluid-operated components and/or fluid carrying systems, and such systems may be referred to as fluid-operated systems or fluid-operated force transfer systems.

Figure 5:
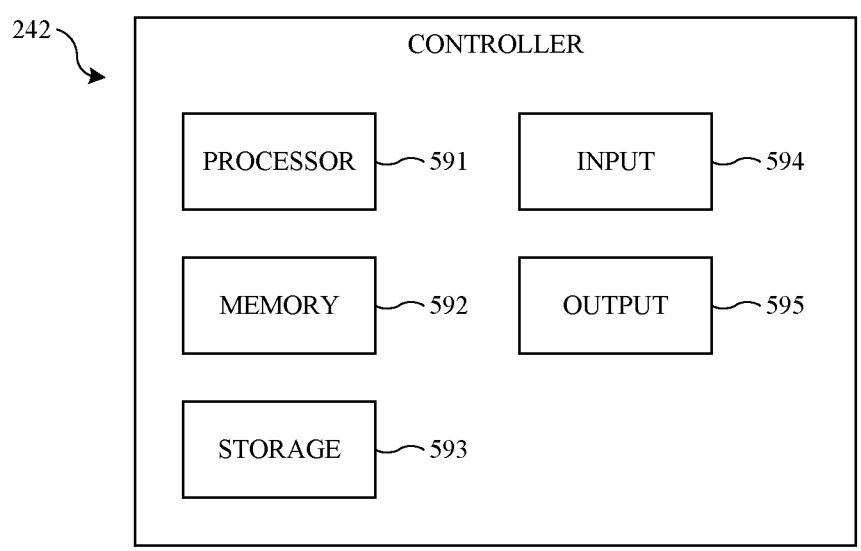
FIG. 5 is a block diagram that shows an example of a controller.

FIG. 5 is a block diagram that shows an example implementation of the controller 242. The controller 242 may include a processor 591, a memory 592, a storage device 593, one or more input devices 594, and one or more output devices 595. The controller 242 may include a bus or a similar device to interconnect the components for communication. The processor 591 is operable to execute computer program instructions and perform operations described by the computer program instructions. As an example, the processor 591 may be a conventional device such as a central processing unit. The memory 592 may be a volatile, high-speed, short-term information storage device such as a random-access memory module. The storage device 593 may be a non-volatile information storage device such as a hard drive or a solid-state drive. The input devices 594 may include any type of human-machine interface such as buttons, switches, a keyboard, a mouse, a touchscreen input device, a gestural input device, or an audio input device. The output devices 595 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

As described above, one aspect of the present technology is suspension control, which may, in some implementations, include the gathering and use of data available from various sources to customize operation based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suspension control can be performed using non-personal information data or a bare minimum amount of personal information, other non-personal information available to the devices, or publicly available information.

What is claimed is:

1. A mass damper system, comprising:
   an unsprung mass;
   a sprung mass;
   a suspension component that supports the sprung mass with respect to the unsprung mass;
   a damper mass that is connected to the unsprung mass;
   motion control components that are connected to the sprung mass; and
   a fluid-operated system that transfers forces between the motion control components and the damper mass to regulate motion of the damper mass with respect to the unsprung mass,
   wherein the motion control components include a spring and at least one of a damper or an actively controlled actuator that apply a resultant force in opposition to an inertial force from the damper mass.

2. The mass damper system of claim 1, wherein the fluid-operated system transfers forces from the motion control components to the damper mass using a leader-follower arrangement.

3. The mass damper system of claim 2, wherein the leader-follower arrangement of the fluid-operated system includes a first fluid-operated cylinder that is connected to the damper mass, a second fluid-operated cylinder that is connected to the motion control components, and a fluid carrying connection between the first fluid-operated cylinder and the second fluid-operated cylinder.

4. The mass damper system of claim 1, wherein the suspension component is an active suspension component.

5. The mass damper system of claim 4, wherein the active suspension component is at least one of an electrically operated active suspension actuator or a fluid-operated active suspension actuator.

6. The mass damper system of claim 1, wherein the unsprung mass includes a vehicle wheel assembly and the sprung mass includes a vehicle body structure.

7. The mass damper system of claim 1, wherein the fluid-operated system includes a first fluid-operated cylinder that is connected to the damper mass, and a second fluid-operated cylinder that is connected to the motion control components, and a fluid carrying connection between the first fluid-operated cylinder and the second fluid-operated cylinder.

8. The mass damper system of claim 7, wherein the fluid-operated system includes a fluid carrying connection between the first fluid-operated cylinder and the second fluid-operated cylinder.

9. A vehicle, comprising:

an unsprung mass;

a sprung mass;

a suspension component that supports the sprung mass with respect to the unsprung mass;

a first fluid-operated cylinder;

a damper mass that is connected to the unsprung mass by the first fluid-operated cylinder, wherein the damper mass applies an inertial force to the first fluid-operated cylinder;

a second fluid-operated cylinder;

a spring that is connected to the second fluid-operated cylinder;

a damper that is connected to the second fluid-operated cylinder, wherein the spring and the damper cooperate to apply a resultant force to the second fluid-operated cylinder; and a fluid carrying connection between the first fluid-operated cylinder and the second fluid-operated cylinder that transfers the inertial force and the resultant force between the first fluid-operated cylinder and the second fluid-operated cylinder to regulate motion of the damper mass with respect to the unsprung mass.

10. The vehicle of claim 9, wherein the unsprung mass includes a wheel assembly, the first fluid-operated cylinder is connected to the wheel assembly, and the damper mass is movable with respect to the wheel assembly.

11. The vehicle of claim 9, wherein the sprung mass includes a vehicle body structure, the second fluid-operated cylinder is connected to the vehicle body structure, the spring is connected to the vehicle body structure, and the damper is connected to the vehicle body structure.

12. The vehicle of claim 9, wherein the fluid carrying connection connects the first fluid-operated cylinder and the second fluid-operated cylinder in a leader-follower arrangement.

13. The vehicle of claim 9, wherein the fluid carrying connection includes a fluid line that is connected to the first fluid-operated cylinder and the second fluid-operated cylinder.

14. The vehicle of claim 9, wherein the suspension component is at least one of an electrically operated active suspension actuator or a fluid-operated active suspension actuator.

15. A vehicle, comprising:

an unsprung mass;

a sprung mass;

a suspension component that supports the sprung mass with respect to the unsprung mass;

a first fluid-operated cylinder;

a damper mass that is connected to the unsprung mass by the first fluid-operated cylinder, wherein the damper mass applies an inertial force to the first fluid-operated cylinder;

a second fluid-operated cylinder;

a spring that is connected to the second fluid-operated cylinder;

an actuator that is connected to the second fluid-operated cylinder, wherein the spring and the actuator cooperate to apply a resultant force to the second fluid-operated cylinder; and a fluid carrying connection between the first fluid-operated cylinder and the second fluid-operated cylinder that transfers the inertial force and the resultant force between the first fluid-operated cylinder and the second fluid-operated cylinder to regulate motion of the damper mass with respect to the unsprung mass.

16. The vehicle of claim 15, further comprising:

one or more motion sensors; and a controller, wherein the controller causes the actuator to apply a reaction force to the second fluid-operated cylinder based on motion signals that are output by the one or more motion sensors.

17. The vehicle of claim 15, wherein the unsprung mass includes a wheel assembly, the first fluid-operated cylinder is connected to the wheel assembly, and the damper mass is movable with respect to the wheel assembly.

18. The vehicle of claim 15, wherein the sprung mass includes a vehicle body structure, the second fluid-operated cylinder is connected to the vehicle body structure, the spring is connected to the vehicle body structure, and the actuator is connected to the vehicle body structure.

19. The vehicle of claim 15, wherein the fluid carrying connection connects the first fluid-operated cylinder and the second fluid-operated cylinder in a leader-follower arrangement.

20. The vehicle of claim 15, wherein the fluid carrying connection includes a fluid line that is connected to the first fluid-operated cylinder and the second fluid-operated cylinder.

21. The vehicle of claim 15, wherein the suspension component is at least one of an electrically operated active suspension actuator or a fluid-operated active suspension actuator.

* * * * *